Figure 1:
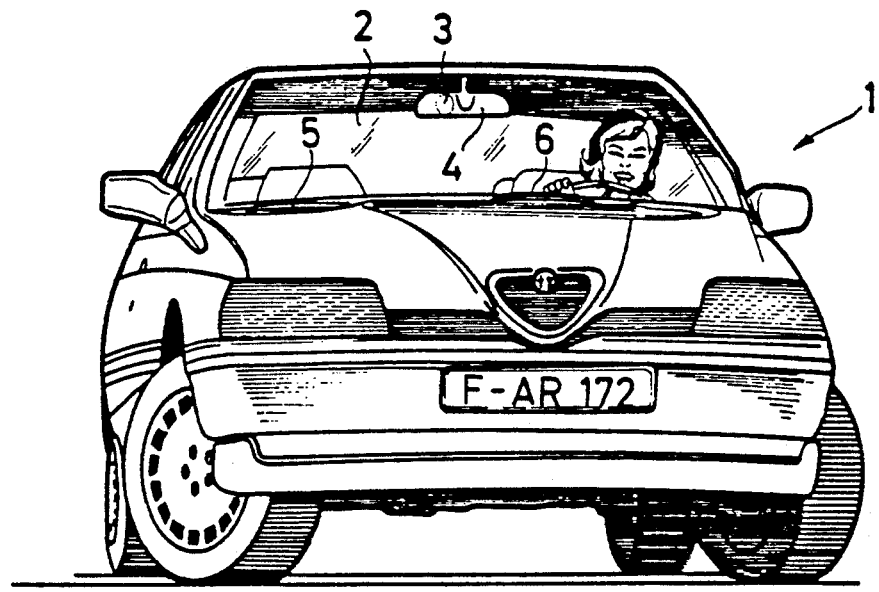

United States Patent [19]

Dröge

[11] Patent Number: 5,306,992
[45] Date of Patent: Apr. 26, 1994

[54] DEVICE FOR CONTROLLING A DRIVE MECHANISM FOR AN AUTOMOTIVE ACCESSORY

[75] Inventor: Bernhard Dröge, Neuberg, Fed. Rep. of Germany

[73] Assignee: Etablissement Voralp, Liechtenstein, Fed. Rep. of Germany

[21] Appl. No.: 585,096

[22] PCT Filed: Jan. 23, 1990

[86] PCT No.: PCT/DE90/00037
§ 371 Date: Sep. 26, 1990
§ 102(e) Date: Sep. 26, 1990

[87] PCT Pub. No.: WO90/08680
PCT Pub. Date: Aug. 9, 1990

[30] Foreign Application Priority Data

Jan. 26, 1989 [DE] Fed. Rep. of Germany ....... 3902231
Sep. 14, 1989 [DE] Fed. Rep. of Germany ....... 3930732

[51] Int. Cl.$^5$ ................................................ B60S 1/08
[52] U.S. Cl. .................................. 318/483; 318/444; 318/DIG. 2
[58] Field of Search ......... 318/443, 444, 483, DIG. 2; 15/250.12, 250.17

[56] References Cited

U.S. PATENT DOCUMENTS

| | | |
|---|---|---|
| 3,649,898 | 3/1972 | Inoue ....................... 318/483 |
| 4,010,383 | 3/1977 | Grassmann ............... 318/483 X |
| 4,317,073 | 2/1982 | Blaszkowski ............. 318/483 |
| 4,463,294 | 7/1984 | Gibson ...................... 318/443 X |
| 4,495,452 | 1/1985 | Boegh-Peterson ......... 318/444 |
| 4,595,866 | 6/1986 | Fukatsu et al. ........... 318/444 |
| 4,689,536 | 8/1987 | Iyoda ......................... 318/483 |
| 4,705,998 | 11/1987 | Millerd et al. ............ 318/444 |
| 4,710,878 | 12/1987 | Iyoda ........................ 364/424 |
| 4,740,735 | 4/1988 | Hayashi ..................... 318/483 |
| 4,867,561 | 9/1989 | Fujii et al. ................. 318/483 |
| 4,956,591 | 9/1990 | Schierbeek et al. ....... 318/483 |
| 4,987,354 | 1/1991 | Steinmann ................. 318/444 |

Primary Examiner—Bentsu Ro
Attorney, Agent, or Firm—Koda and Androlia

[57] ABSTRACT

The invention concerns a device for controlling a drive mechanism (70), e.g. for windshield wipers (5, 6), wiping/washing systems, sliding roofs and tops of motor vehicles dependent on how moist or dirty the windshield is on the outside. With help of a sensor (3) and a special computation circuit, the degree and type of moisture or dirt can be ascertained. Depending on whether or not there is only a fine mist or a heavy thundershower, the appropriate circuits on the windshield wipers (5, 6), sliding roofs or tops are automatically actuated. If dirt is detected on the windshield (2), then a wiping/washing system is switched on. Sudden splashes on the windshield, which appear just before the last wiping action of a wiper (5, 6) is completed, are definitely detected and lead to a new wiping action.

26 Claims, 8 Drawing Sheets

DEVICE FOR CONTROLLING A DRIVE MECHANISM FOR AN AUTOMOTIVE ACCESSORY

The invention concerns a device for controlling a drive mechanism for an automotive accessory.

An effective windshield wiper system is very important both for the safety of a vehicle and the occupants of a vehicle. In modern windshield wiper systems, a number of speed levels are provided which enable the driver to adapt the wiping frequency to weather conditions. A conventional switch or hand lever on the steering column of a motor vehicle has, for example, four settings. The off-position shuts the drive motor off and interrupts the action of the windshield wipers. High and low wiping speed are provided for heavy to light rain or snowfall. In addition, many vehicles are provided with a delay control with which the wiper action can be adjusted. In various delay cycles, the wiper speed can be set so that there is a pause of 1 to 10 seconds between the back and fourth motion of the windshield wipers. The delay control makes it possible for the driver to set a selected wiper speed depending on how much he feels that visibility is impaired by the fallen moisture.

In all possibilities of the above-noted wiper systems, the speed of the back and fourth motion of the wipers is constant. A fixed pause follows each back and forth motion; said pause remains constant until the driver sets another switch position.

In most cases, however, it is difficult to find a switch position at which the windshield remains free from moisture without frequently resetting the position. The intensity of the rain or snowfall can, for example, change quickly. Moreover, when passing, water from the street can splash onto the windshield and suddenly block the driver's visibility through the windshield. A considerable reaction time is often required to set the appropriate speed so that the windshield is once again free from moisture.

In order to free the driver from these adjustment tasks, numerous methods for the automatic operation of windshield wiper motors in motor vehicles are already known, in which the moisture on the front windshield is measured optically, electrically or acoustically (German Disclosures 18 08 521, 23 04 302, 23 45 546, 32 03 091, 35 15 409, 33 14 770, DE-PS 31 44 546, EP-A-0 177 419, U.S. Pat. No. 4,554,493, U.S. Pat. No. 4,665,351, U.S. Pat. No. 4,703,237, U.S. Pat. No. 4,495,452, U.S. Pat. No. 4,317,073, AU-A-59 164/86, GB-A-1 596 050, JP 182567/86, JP 184448-9/86, JP 206255/86, JP 126340/87, JP 129749/87, JP 193954/86, JP 170638/86). The disadvantage of most of the known methods is, however, that the windshield wiper is not always actuated when required.

Furthermore, a device is known for switching an electric windshield wiper motor in vehicles on and off in response to rain, with a sensor which reacts to the wetness on the windshield of the vehicle and which produces a sensor signal having an amplitude dependent on the moisture (PCT/DE88/00374). In this case, an on-signal is only produced when there is a temporary increase in amplitude in the sensor signal which is above a preset amplitude size of the sensor signal. The disadvantage of this known device is that it brings about a new release of the windshield wiper motor when there is the slightest variation in moisture on the windshield, even though such a release might not be necessary. This disadvantage is caused by the fact that the variation of the sensor signal and the tendency of the variation are ascertained, whereas the amount of the variation is not.

Moreover, with this device, the amplitude of the sensor signals remains constant even when the wiper blades have passed over the sensor for the last time when returning to the starting position and a passing vehicle subsequently drives through a puddle and causes a heavy water splash to hit the sensor. This is a disadvantage because, even though the windshield is wet, no new start pulse is emitted for the windshield wiper motor.

A further disadvantage of the known device can lie in the fact that, if no special measures are taken, the windshield wiper stops in the middle of the windshield. If the wiper blade has dried the sensor on its return and if, after the drying operation, it is situated in direction toward its starting position, then the drying of the sensor first of all effects an increase of the resistance and with it a reduction in the amplitude of the sensor signal. The one condition for releasing a start command, i.e. that the amplitude of the sensor signal is increasing, is therefore temporarily not fulfilled. However, it is immediately fulfilled again when e.g. it is raining very heavily because the moisture on the sensor then increases very rapidly. When a large amount of water strikes after the sensor has been dried, the windshield wiper receives a new wipe impulse so that, when the sensor signal forms the only start criterion for the wiper motor, it then no longer reaches its starting position and returns to the sensor and beyond without first having returned to its starting position, or when the end position of the windshield wiper is also used as start criterion for the wiper motor and the windshield wiper therefore returns to its starting position due to a special control, it does not receive a new wipe command in this starting position because the previously emitted wipe command is no longer effective. Both are very inconvenient, since, on the one hand, the driver is accustomed to the fact that the windshield wiper makes complete wiping movements up to the starting position and, on the other hand, a belated splash should also start the wiping operation.

It is the object of the invention to create a device for controlling a drive mechanism for an automotive accessory which does not have the above-described disadvantages.

This object is solved according to the features of patent claim 1.

The advantage attained with the invention is, in particular, that the windshield wiper or wipers of a vehicle only reverse direction in their respective left or right end position and not in an intermediate position on the windshield, although a sensor control with threshold character is used. The usual wiping rhythm is thus not influenced by the sensor control. Moreover, an automatic release of the windshield wiper control takes place only when it is actually raining and not already when there is residual moisture on the windshield. Furthermore, the invention is particularly suitable for also automatically controlling a sliding roof.

Figure 2:
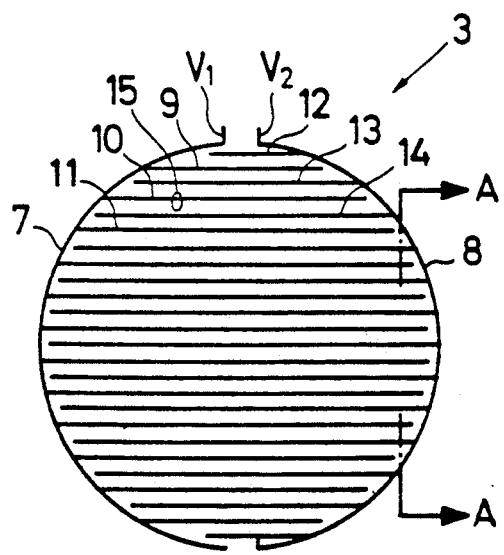
Figure 3:
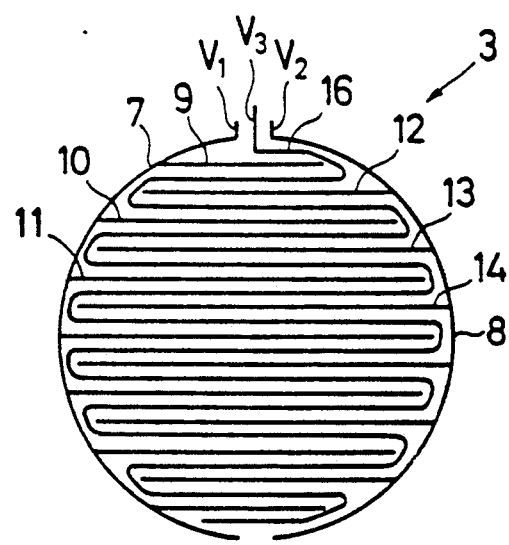
Figure 4:
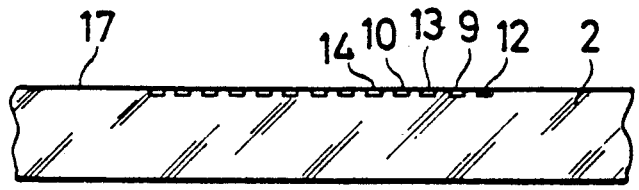
Figure 5:
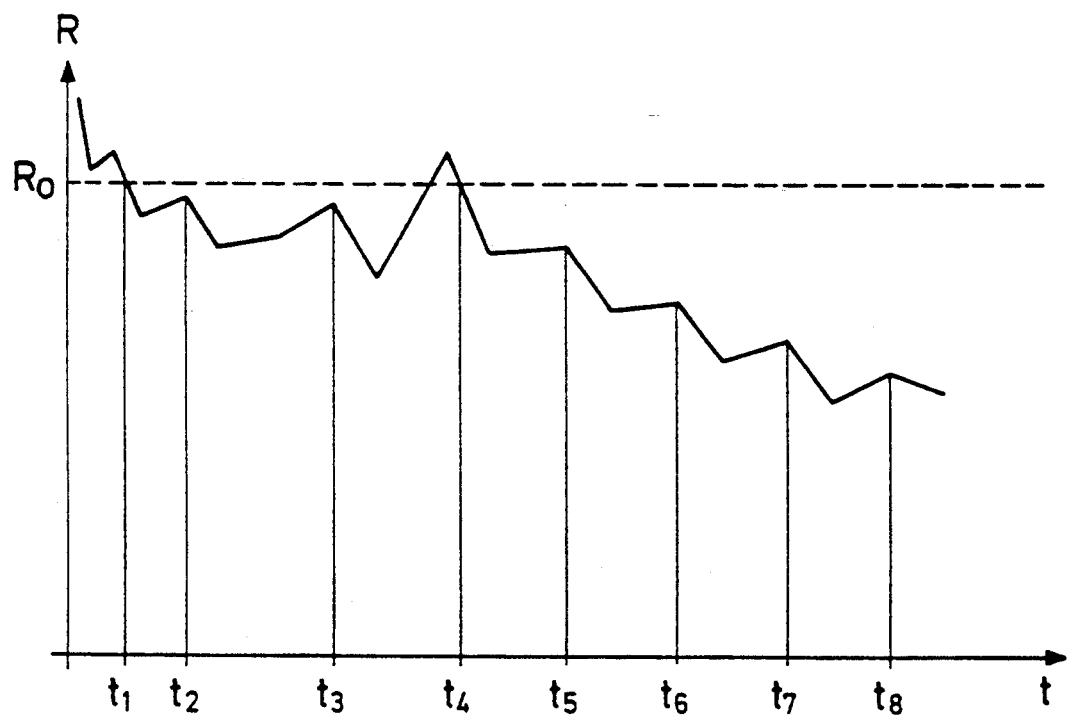
Figure 6:
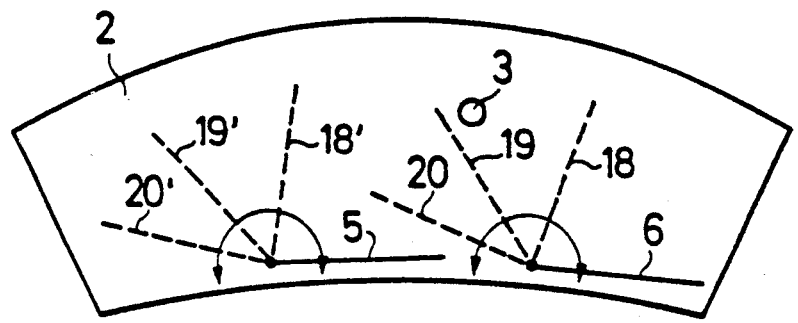
Figure 7:
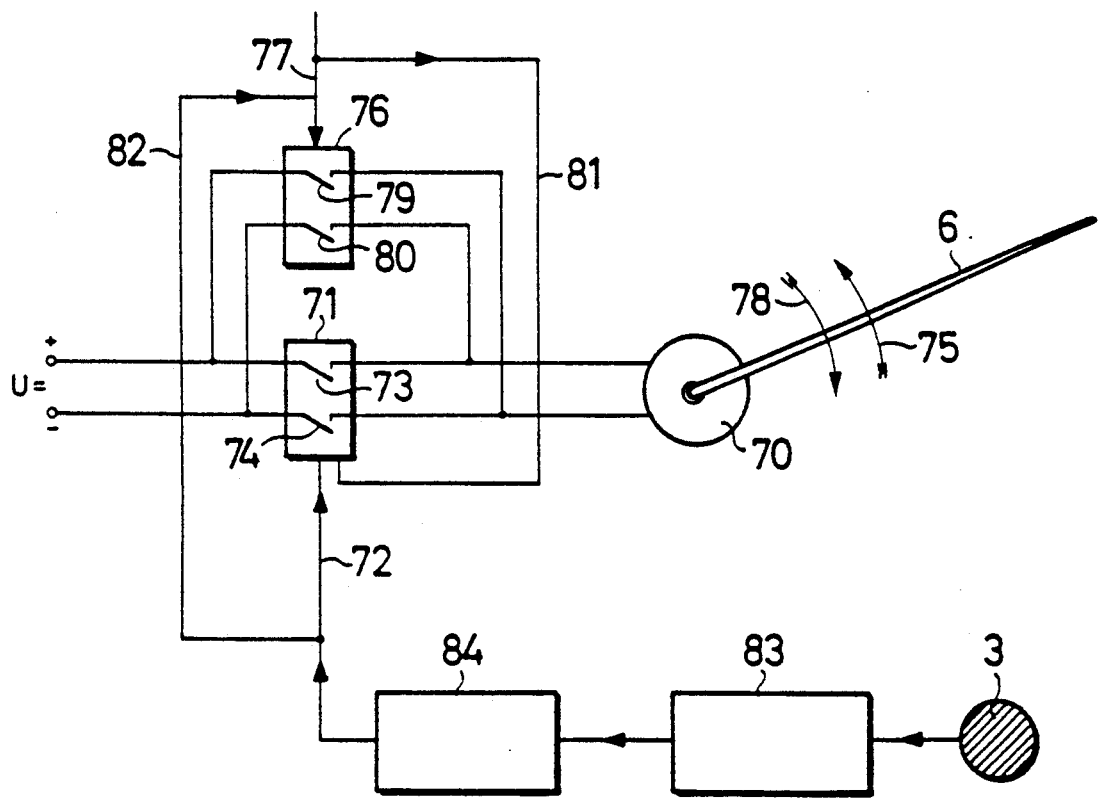
Figure 8:
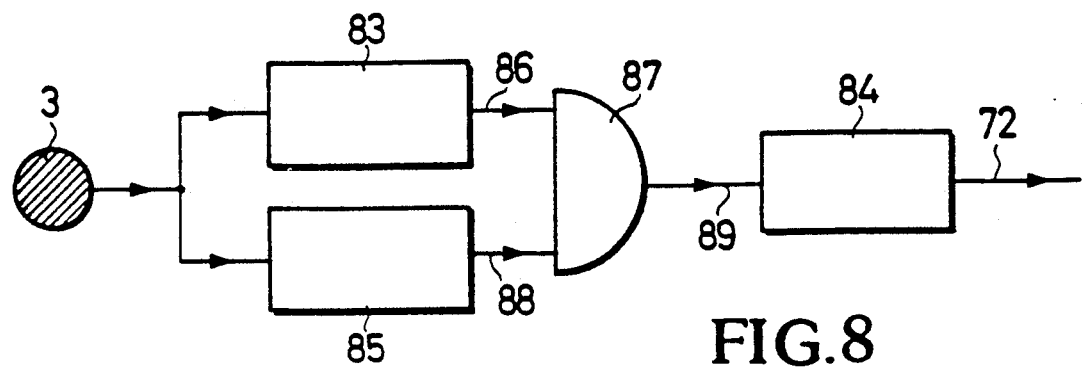
Figure 9:
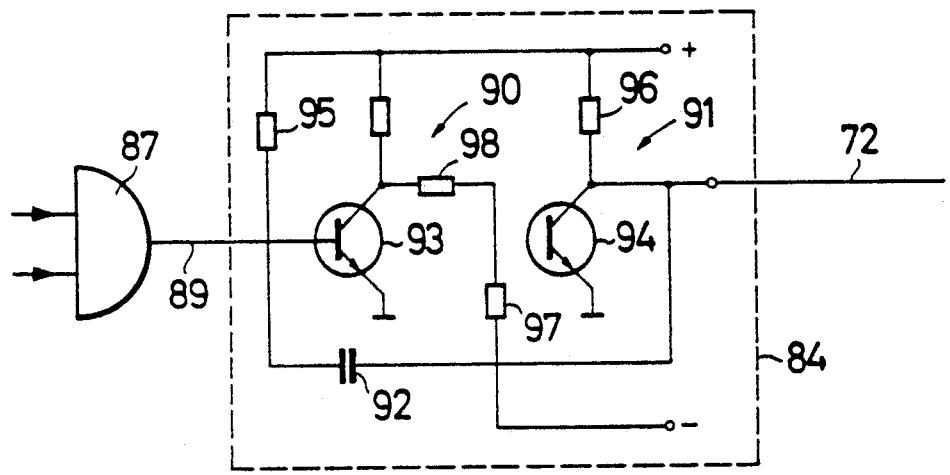
Figure 10:
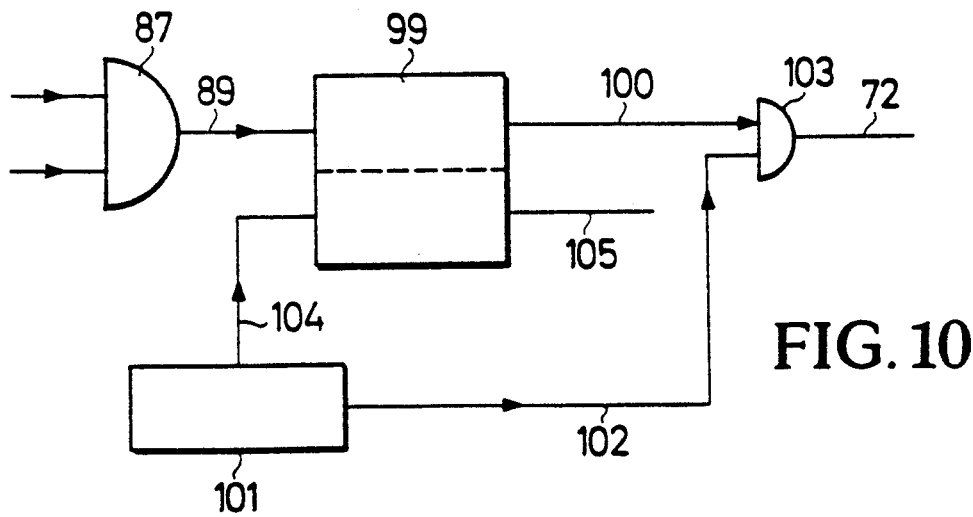
Figure 11:
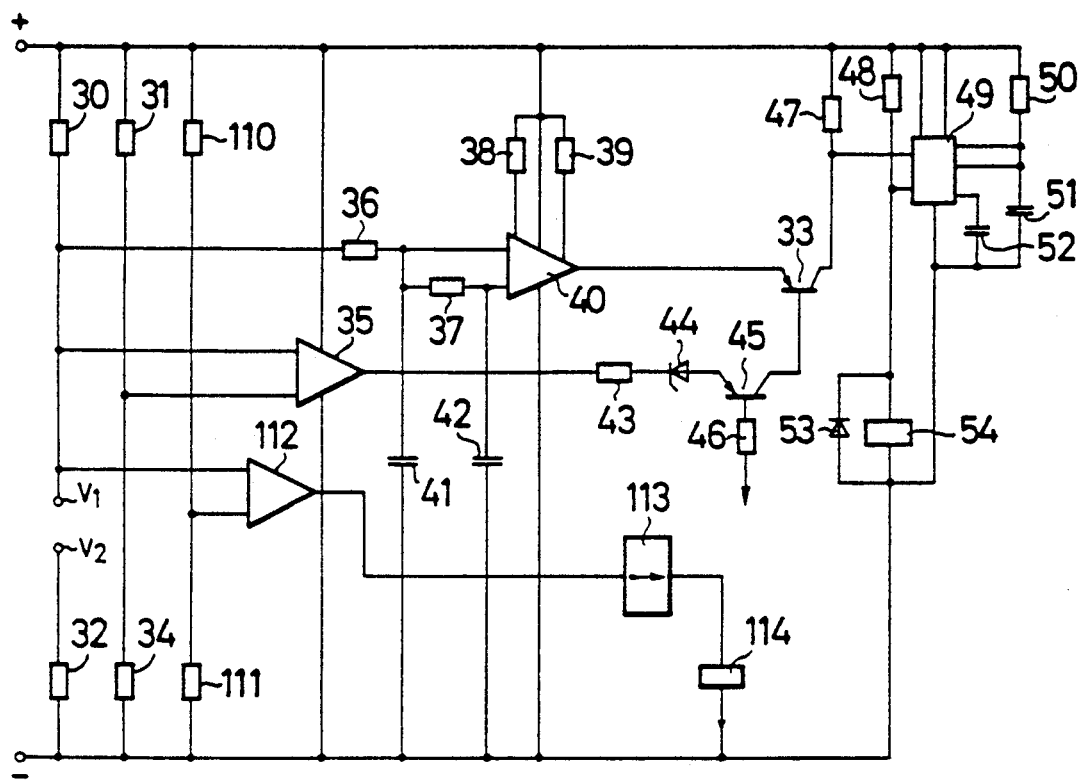
Figure 12:
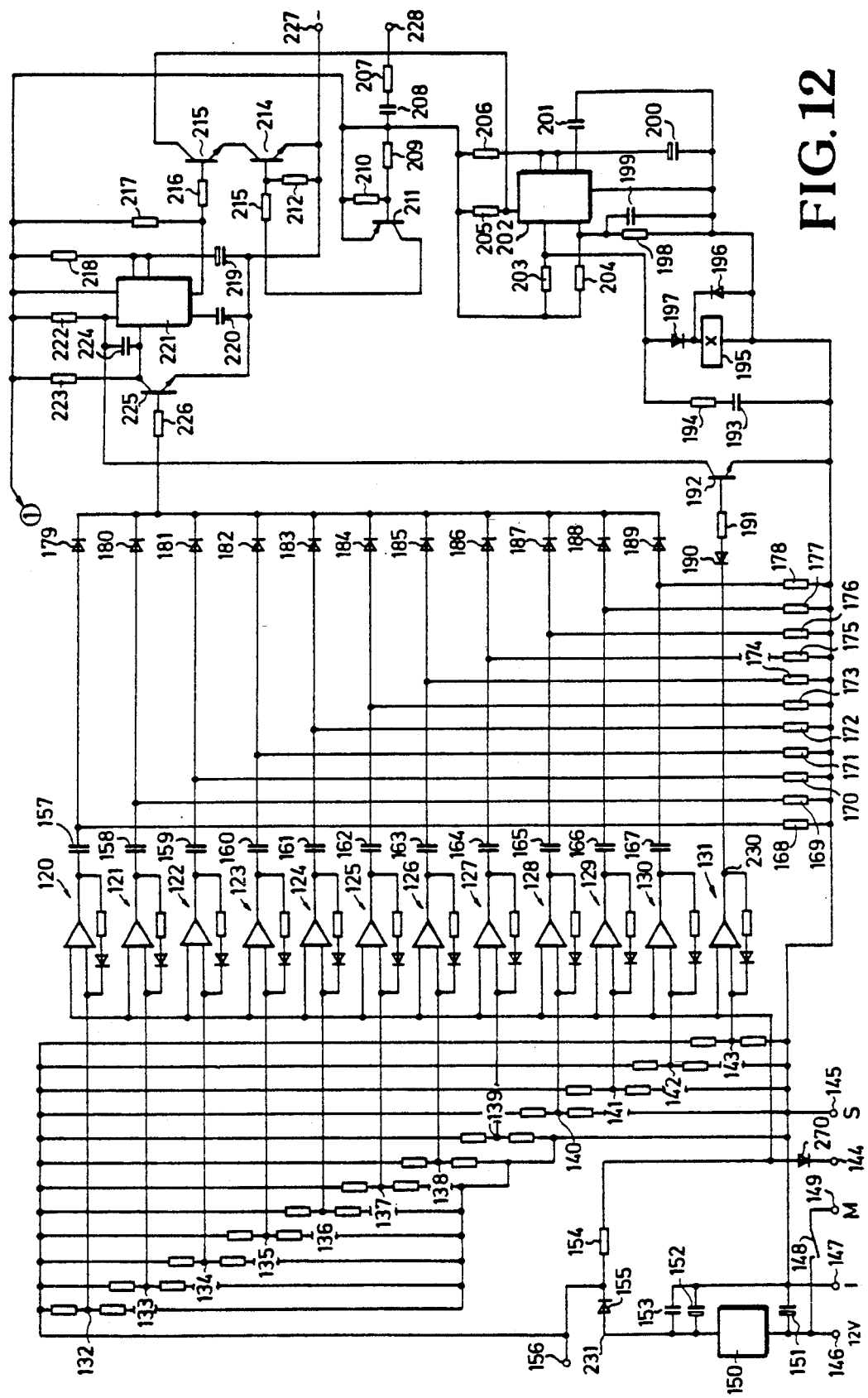
Figure 13:
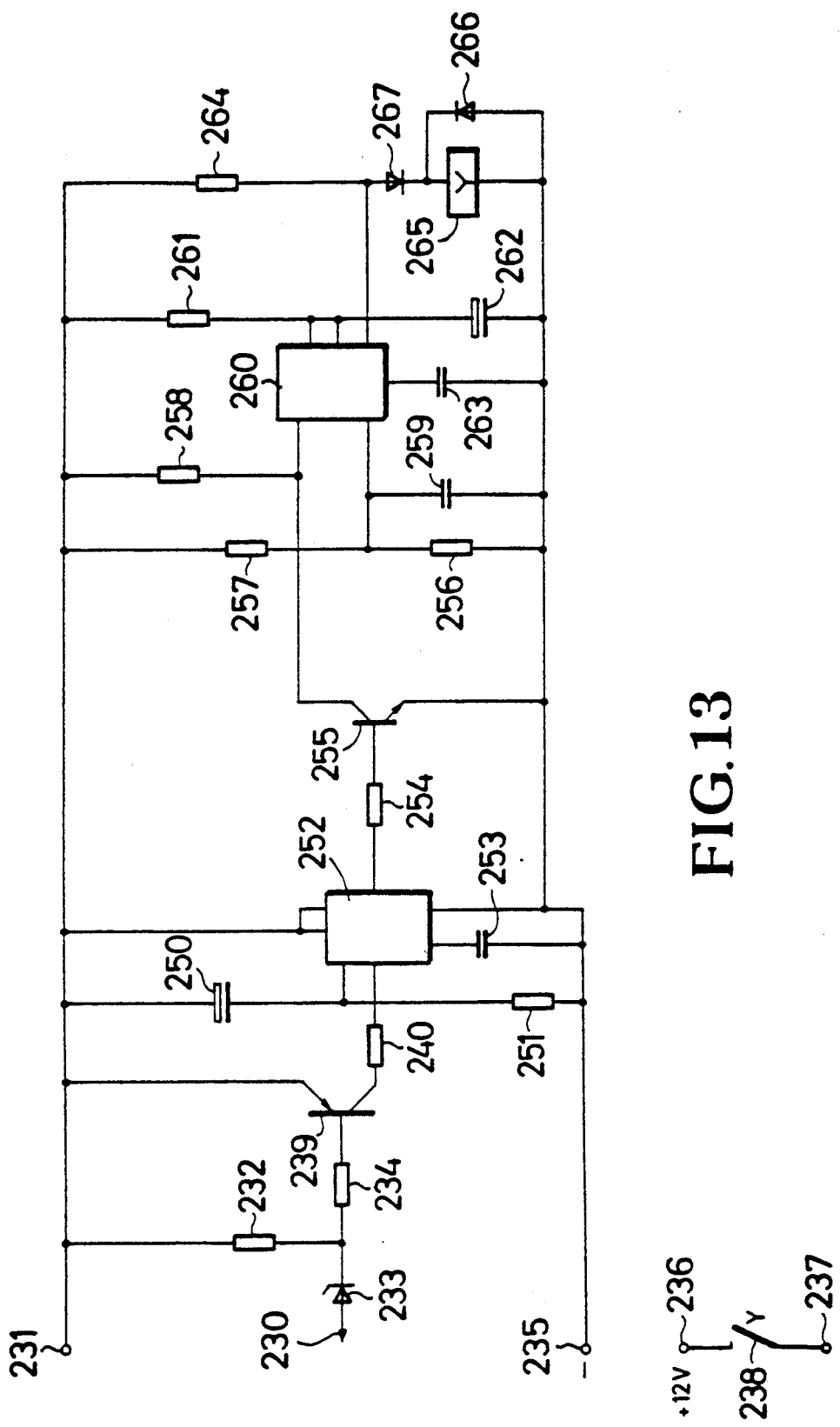
Figure 14:
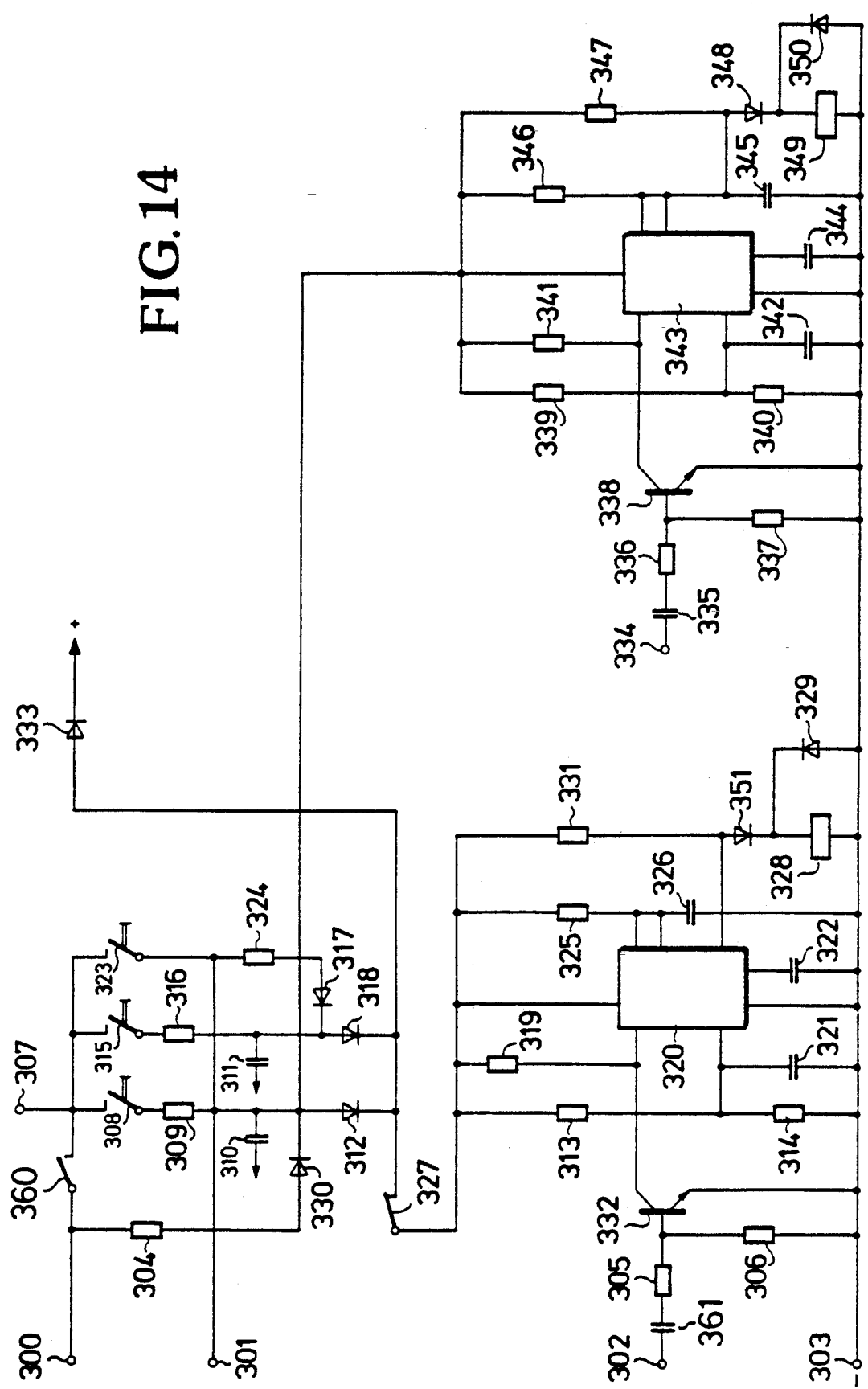

Embodiments of the invention are illustrated in the drawings and described in greater detail in the following, showing:

FIG. 1 a passenger vehicle with a front windshield on which a moisture sensor is attached;

FIG. 2 a more precise illustration of the sensor placed in a front windshield;

FIG. 3 a variation of the sensor shown in FIG. 2 which is suitable for detecting moisture produced by fog;

FIG. 4 a cross-section through a windshield having a sensor according to FIG. 2;

FIG. 5 the time slope of the ohmic resistance of the sensor when moisture appears on the windshield;

FIG. 6 a schematic illustration of the movements of the wipers on a windshield with moisture sensor;

FIG. 7 a basic illustration of a control device for a windshield wiper motor;

FIG. 8 a circuit arrangement of a computing circuit for a moisture sensor signal;

FIG. 9 a signal-delay circuit with astable multivibrator;

FIG. 10 a signal-delay circuit with resettable flip-flop;

FIG. 11 a circuit arrangement for obtaining the computing circuit according to FIG. 8;

FIG. 12 a circuit with numerous threshold switches for evaluating the pattern of ohmic resistance values dependent on the moisture;

FIG. 13 a circuit for carrying out the washing process;

FIG. 14 a circuit for controlling a sliding roof or a roof to be raised of a motor vehicle.

FIG. 1 shows a passenger vehicle 1 which has a windshield 2 which is provided with a moisture sensor 3. The size of this moisture sensor 3 is approximately seven cm² to eighty cm² and is preferably placed in such a way that it is concealed by a rearview mirror 4 out of the driver's sight and, as the case may be, also out of a co-driver's sight, so that it does not interfere with the field of vision. Two windshield wipers 5, 6 can be seen at the bottom edge of the windshield, of course, instead of these two small windshield wipers, one large and central windshield wiper can be provided which serves the entire windshield.

The surface of the sensor is, therefore, fixed at approximately seven to eighty cm² because, on the one hand, the likelihood of an even degree of moisture on the sensor and the rest of the windshield surface would not be very great with a smaller surface and because, on the other hand, with a larger surface, visibility and thus driving safety would be affected.

It should also be noted that sensor 3 should be placed in the upper third of the wiping area in view of the fact that, depending on whether and air flow, the two lower thirds of the windshield 2 are significantly less wet than the upper third. If sensor 3 were affixed in one of the two lower thirds, then the result of this might be that the moisture interfering with visibility is detected too late.

Placing sensor 3 in the upper third is advantageous even in winter when the windshield 2 is covered with frost or ice, since a frost or ice layer is not recognized as moisture. If the ice layer melts — experience has shown that thin layers of ice are often not scraped off but removed by means of heating —, then the ice melts from the bottom to the top, i.e. it becomes moist at the bottom sooner than at the top. With a sensor 3 placed at the bottom, this would result therein that it would already register moisture when there is still ice at the top. Wipers 5, 6 would then be switched on even though the upper third of the windshield 2 is still covered with ice.

FIG. 2 shows the mechanical structure of the moisture sensor 3 in detail. A first conduction path arrangement 7 is seen here which is opposite the second conduction path arrangement 8. Both conduction path arrangements 7, 8 have branching-off stays 9, 10, 11 or 12, 13, 14 respectively which engage in a comb-like manner. While the first conduction path arrangement 7 is at a first electric potential $V_1$, the second conduction path arrangement 8 is connected to a second electric potential $V_2$. The conduction path arrangements 7, 8 consist e.g. of silver and are connected to direct-current potentials $V_1$, $V_2$ at their ends, i.e. their ohmic resistance is being monitored. The entire arrangement consisting of conduction path arrangements 7 and 8 is embedded in the windshield 2, namely, in such a way as is shown in greater detail in the following FIG. 4. If two stays, e.g. 10 and 14, belonging to different conduction path arrangements 7, 8, are spanned by a drop of water 15, then the total electric resistance which is formed by the two conduction path arrangements 7, 8 changes. In practice, the spanning of two stays by a drop of water 15 in no way leads to a short-circuit nor does the total ohmic resistance of the conduction path arrangements 7, 8 suddenly return to zero from infinity. On the contrary, the resistance is already not infinity prior to being wet with moisture but, instead, in the ten-Mohm range which is conditioned by pollution which can never be completely avoided and by the fact that the resistance of a good insulator is not infinite between two stays. If a drop spans two of these stays, then the decrease in resistance depends largely on the type of drop. So-called "acid rain", which is an electrolyte, of course effects a much higher drop in resistance than distilled water. Due to the spanning of two stays, therefore, the total resistance of sensor 3 shown in FIG. 2 will go from the ten-Mohm range to the hundred-Kohm range. The more stays are spanned by additional rain drops, the greater is the fall of the ohmic resistance since the pairs of stays connected to one another by water drops are connected in parallel. As in a conventional circuit with parallel ohmic resistances, the total resistance therefore drops with each closed parallel resistance.

Just as, on the one hand, the ohmic resistance does not suddenly drop from infinity to zero after a rain drop has hit, it also does not, on the other hand, suddenly increase from zero to infinity after a wiping operation. Dirt and residual moisture continue to remain for a certain time after a wiping operation, even with the best wiper blades and with the smoothest windshield surface.

The boundary between "moist" and "dry" must therefore be established by a threshold value of the ohmic resistance to be defined. The wiper will only be actuated when the resistance falls below this threshold.

FIG. 3 shows a variation of the arrangement in FIG. 2 in which a third conduction path 16, which is at a potential $V_3$, is inserted between the two conduction path arrangements 7 and 8. This second variation is suitable, in particular, for detecting moisture caused by fog. Fog is different from rain in that it consists of a number of very small water droplets which do not meet even when the droplet density is extensive and, as a result, cannot span conductors which are spaced far apart. By adding a third conduction path 16, the distance between two conduction path arrangements 7, 16 or 8, 16, respectively, is decreased so that it can be determined if there is fog or not by evaluating the measurable resistances at $V_1/V_3$ or $V_3/V_2$ respectively and/or $V_1/V_2$. The third conduction path 16 can then serve to establish a mean value for the amplitude size in order to be able to determine whether or not it is fog or clean rain, on the one hand, or normal and polluted rain, on the other hand. The electric conductivity of polluted normal rain is much higher than the conductivity of fog or clean rain.

In addition to $R_0$, it is also possible to introduce a fog-resistance threshold $R_{fog}$ so that, when the resistance is longer than a preset time between $R_0$ and $R_{fog}$, a wiping action can be triggered. A resistance value between $R_0$ and $R_{fog}$ is also attained when there is no fog, but it does not appear for a certain time or when there is heavy rain for which the above described circuit is adequate. The fog circuit could be provided as OR-circuit in this case. A preset time for $R_{fog}$ is allowable, since a wiping frequency above this time is not used when there is fog. With the transition from fog to rain or the like, the wiper release is assumed by the already described arrangement. A fog evaluation of this type can also be realized without a third loop in the sensor, that is, solely by means of electronic devices.

FIG. 4 shows a section A—A through the arrangement of FIG. 2. As can be seen in this diagram, the stays of the individual conduction path arrangements 7, 8 are placed just below surface 17 of windshield 2, that is, in such a way that their outwardly directed surfaces align exactly with the outwardly directed surface 17 of windshield 2. This ensures that no dirt and moisture can settle in grooves which considerably influence the resistance values. By precisely working the conductors into the windshield 2, it is then possible to unequivocally trace the resistance variations of the sensor back to the striking rain and not to possible side effects.

In known moisture sensors, the conduction paths of the sensor were often affixed to the outside of the windshield so that they projected in comparison to the surface of this windshield, even if only slightly, that is, in the $\mu$-range. As a result, considerable mistakes occur when determining the resistance. However, a slight negative form of the conduction paths can be allowed vis-a-vis the windshield surface. If, however, the conduction paths lie too far below the glass insulation of the windshield, then break-away drops occur during the wiping operation and an undesired resistance error occurs.

FIG. 5 shows how the total ohmic resistance of the arrangement of FIG. 2 behaves when rain falls on windshield 2. When, at first, windshield 2 is dry, the ohmic resistance R in the range $t < t_1$ has a very high value and then gradually decreases when rain drops strike, only to increase again when e.g. rain drops are blown away by air flow. This is indicated by the vertical line between $t=0$ and $t_1$. If the rain continues, then the resistance R will drop in each case until it reaches a critical value $R_0$. This critical value is attained in the present example at moment $t_1$. By means of a threshold-detection circuit, which will be described below, this threshold can be detected, whereupon the windshield wiper 5, 6 receives a command to begin wiping. At the start of the wiping action, the windshield wipers are in the starting position so that the wiping command is automatically a home-position command. This situation no longer applies to the subsequent wiping operations because the moisture threshold can be exceeded in almost all wiper positions. If windshield wiper 5, 6 has, coming from its starting position, passed over the sensor, then it will become dry or almost dry which leads to an increase of the resistance value. This is indicated by the curve which is again ascending in the range between $t_1$ and $t_2$. However, at moment $t_2$, moisture again reaches the windshield which leads to a drop in resistance. When returning to its starting position, the windshield wiper again wipers over the sensor, so that an increase in the resistance value can be seen between $t_2$ and $t_3$. If one now assumes that it will not continue to rain heavily, then the next wiping action of the windshield wiper causes the resistance value to continue to increase until it reaches a value which can be read at moment $t_3$ from the $R = f(t)$ curve.

The above described subject matter is again explained in detail with reference to FIG. 6. If one proceeds from the fact that sensor 3 becomes so wet, due to a sudden rain, that the ohmic resistance falls below the critical or threshold value $R_0$, then a start signal is given to a windshield wiper motor due to the fall below the threshold value, whereupon the windshield wipers 5, 6, which have thusfar been in their starting position, begin to move and successively assume the intermediate positions 18 or 18', 19 or 19' and the second end position 20 or 20', respectively. They return to their starting position from this second end position. If windshield wiper 6 has assumed position 19 on its way from the starting position, then sensor 3 is wiped dry or almost dry, i.e. the previously fallen ohmic resistance increases again, only to drop again until end position 20 of wiper 6, insofar as the rain continues. Drying of sensor 3 by the windshield wiper is not necessarily such that threshold $R_0$ is always exceeded again, as is indicated just before $t_4$ in FIG. 5. On the contrary, the threshold value can be below $R_0$ during the entire rainfall. In this case, a start signal is continually present for the windshield wiper, which is, however, only activated when the wiper has reached its starting position. If it receives a control pulse in its starting position, then it is activated for a complete back and forth movement. The drying of sensor 3, which actually produces a stop signal, is ignored during a wiping phase with respect to switching the wiper motor on and off. If it were taken into consideration, then this would mean that the threshold value $R_0$ could be, at least for a short time, exceeded with each wiping action and that, during this time period in which windshield wiper 6 e.g. goes from position 18 to position 19, a stop command would be given for the wiper motor. In other words: The drying or quasi-drying of sensor 3 would cause, with a pulse control of the windshield wiper motor, the motor to be shut off in position 19. Thus, windshield wiper 6 would stop in this position 19. This stopping would not, however, continue for a long time because sensor 3 would then become wet again due to the rain and, as a result, give off a new start pulse to the windshield wiper motor. Wiper 6 would then move to end position 20, would there be reversed with respect to its direction of rotation e.g. by means of a mechanical, optical or other device for detecting the end position, and again reach sensor 3 which would give a further stop command to the windshield wiper motor after the quasi-drying. Windshield wiper 6 would, in this case, stop a little to the right of sensor 3, would then, however, soon move on toward the right because the windshield wiper motor would have received a control command due to the sensor becoming wet again.

The disadvantage of this windshield wiper control operating with stop pulses would be the momentary stopping of the wiper just in front of or behind sensor 3. For this reason, the activation principle is usually used in which the windshield wiper makes a complete forward and return stroke once it has received a start pulse. Of course, the deactivation or switch-off principle could also be used. In this instance, however, the sensor has to almost coincide with the end position of the windshield wiper because only then would a switching off in the starting position be ensured. This would, however, have the disadvantages already described above.

According to the invention, in order to be able to place sensor 3 in the upper area of windshield 2 and still return the windshield wiper into its end position and only start from this end position when it is raining, the start pulse, which is emitted due to the re-appearance of moisture after the sensor has been dried, is stored until the windshield wiper has again assumed its starting position. If the start pulse is only considered on the return of the windshield wiper from position 20 via 19 and 18 to the end position, then a start pulse must be delayed by about that amount of time which the wiper requires to pass from sensor 3 to the starting position, because the triggering start pulse is usually released after sensor 3 has been passed over by the wiper on its return.

Consequently, the usual conditions are thus retained by the invention, then even in conventional windshield wipers without moisture sensor, the wipers start from their starting position in most cases. In this conventional windshield wiper control, though, no additional signals occur, not even during the actual wiping operation. On the other hand, in the present invention, sensor 3 always emits a control signal when a specific resistance threshold is not attained and it must then be decided in each case what is to happen with this additional signal.

According to the invention, all signals of sensor 3 which are produced during travel from the starting position via 18, 29, 20 and back to sensor 3 are ignored with respect to the motor control. Only those signals which are emitted by sensor 3 during the time in which windshield wiper 6 is travelling from sensor 3 to its starting position are evaluated with respect to starting the windshield wiper motor.

A lower storage time than the time needed for the windshield wiper 6 to pass from sensor 3 to its starting position is required when the resistance value again falls below the threshold value, which indicates moisture, just before reaching the end position. In this case, e.g. the start pulse is released in position 18 of windshield wiper 6 and the necessary pulse storage time corresponds to the time required by wiper 6 to pass from position 18 to the end position. In order to realize these varying storage times, it is possible, when a start pulse from sensor 3 appears, to set a flip-flop, which is reset again when the end position of the windshield wiper is reached. The setting time then corresponds to the storage time. A device, which recognizes the end position of the windshield wiper, is required for resetting the flip-flop. If one wishes to do without such a device, the start pulse can be delayed by the time $t_x$, which corresponds to the time required by the windshield wiper to travel from the position at sensor 3 to the end position. Although this pulse arrives belatedly at the windshield wiper motor, that is when the start pulse is first emitted in position 18, the result of this is merely that the windshield wiper remains at rest for a certain time before it again receives a new wiping command. Each time the threshold value is not attained, a new setting of the pulse-delay device is triggered. The result of this is that each moisture detection connected with a threshold value which is not attained is not longer stored after the start of a wiping action, up to and including repeated failure to attain the threshold value until sensor 3 is touched by windshield wiper 6 during the return stroke of the wiper when reaching the rest position. If, however, it is detected that the threshold value has not been attained again after the wiper 6/sensor 3 contact, then the start pulse remains activated.

A basic illustration is shown in FIG. 7 with which the above-described control can be implemented. 70 designates a windshield wiper motor which carries wiper blade 6 and which is at a direct voltage $U_=$ via a relay 71. If relay 71 is operated via a control mechanism 72, then contacts 73, 74 close and place motor 70 at voltage $U_=$. Windshield wiper 6 then moves in direction of arrow 75. With help of a second relay 76, which can be activated via control mechanism 77, it is possible to move wiper blade 6 in direction of arrow 78. Moreover, voltage $U_=$ is placed with inverted polarity at motor 70, which is accomplished thereby that contacts 79, 80 of relay 76 are closed and contacts 73, 74 of relay 71 are opened. A make impulse for relay 76 can thereby be coupled with a break impulse for relay 71, which is indicated by line 81. Conversely, a make impulse for relay 71 can also be coupled with an impulse for opening relay 76, which is shown by line 82. The control pulse for a new wiping operation is given via a special circuit to line 72. This circuit consists of the sensor 3 to which a threshold detector 83 is subsequently connected. If the resistance falls below the threshold $R_0$, which indicates that there is moisture on the windshield, then the threshold detector 83 emits a wiping command which is, however, only to be activated when the windshield wiper is in its end position. The delayed action of the wiping command is attained by a signal delay 84 which controls relay 71 in the end position of windshield wiper 6. If relay 71 were to be immediately started when the threshold value is not attained, i.e. if there were no signal delay, then it could happen that relay 71 would receive a start pulse on the way there of windshield wiper 6 when said wiper 6 has assumed e.g. position 20 in FIG. 6. Since relay 71 is closed anyway at this point in time, the start pulse would be ineffective. This ineffectiveness would, however, not damage anything because the windshield wiper would in any event dry sensor 3 again on its return stroke. It would though become problematic if, after sensor 3 has been dried, a powerful splash of water or the like would reach the sensor on the return stroke. In this case, a control pulse is also emitted when relay 76 is still closed and open relay 71 is not to be closed because the windshield wiper must first of all be in its starting position. The control signal for windshield wiper 6 is then emitted at a point in time a which windshield wiper 6 is still on the return stroke and at which it should in fact remain inactive. At that time, however, when it should act, that is, in the end position of the windshield wiper, there is no longer a pulse. To avoid this disadvantage, control pulse for relay 71 is stored in a signal delay 84 and only activated when the windshield wiper has assumed its end position.

Even if one assumes that threshold detector 83 does not emit any pulses but continuous signals as long as the threshold value is not attained, nothing changes in the result because even this continuous signal would close relay 71 prematurely, i.e. when the windshield wiper has reached its end position. It would then be of no use if the continuous signal, in contrast to a pulse-like signal, were to also be present in the end position of windshield wiper 6. Even a continuous signal should only be activated when the windshield wiper has reached its end position. This delay action is, however, also a delay within the meaning of the present invention.

Up to now, only the threshold value $R_0$ of sensor 3 has been considered. the disadvantage, however, is that, when only considering the threshold value $R_0$ as start criterion for the windshield wiper, the wiper wipes until this threshold value $R_0$ is attained, i.e. it is still wiping when it has already wiped away the rain drops on the windshield, the total resistance value however still lying below $R_0$ due to the residual moisture. This is strange for the motor vehicle driver because he cannot see any reason for further wiping operations.

According to an embodiment of the invention, therefore, a falling curve of the resistance value is referred to as an additional criterion for switching the windshield wiper on. Thus, the windshield wiper is only operated when, on the one hand, the threshold value $R_0$ has been attained or fallen short of and when, on the other hand, the resistance value drops. This ensures that the windshield wiper only wipes when it is raining or when there are powerful splashes of moisture and does not wipe about on a clear windshield, when the windshield has already been wiped, until the resistance value $R_0$ has been attained.

FIG. 8 shows a circuit which, in principle, shows how the windshield wiper or wipers according to the embodiment of the invention are controlled. Here, 83 again designates the device which detects attainment of the ohmic threshold value $R_0$ of sensor 3. If this threshold value is attained or fallen short of, then device 83 emits a command 86 to an input of an AND gate 87. With help of a further device 85, it is ascertained whether the resistance value $R=f(t)$ is decreasing or increasing. Only when the resistance value is decreasing does device 85 give a command 88 to the AND gate 87 which corresponds with the command of device 83 for polarity. As a particularly advantageous and additional feature, device 85 can be constructed in such a way that it not only detects the decreasing tendency of the resistance but also determines the amount by which the resistance must decrease so that a variation tendency can be considered as relevant. In addition, the time can be determined hereby within which the said variation amount must appear. Particulars with respect to this improvement are described in connection with FIG. 12.

The AND gate 87 only connects through in the simple version when the resistance value $R_0$ has been attained or fallen short of and the tendency of the resistance is simultaneously falling. In the further embodiment, the variation must, moreover, still exceed a specific amount so that the AND gate 87 connects through. A windshield wiper could now be started with output signal 89 of the AND gate 87 if one makes allowance for the fact that a splash of rain after the last wiping action, i.e. after a wiping blade has passed over sensor 3 for the last time, would not result in a new triggering of the windshield wiper motor. According to the present invention, the signal of line 89 is, however, emitted in a delayed manner to line 72, whereby the delay is effected by signal delay 84.

A delay circuit 84 is shown in greater detail in FIG. 9. This is a monostable flip-flop which serves to store the logical information inputted via input 89 over a limited period of time. After the time has expired, the flip-flop automatically flips back into the starting position. The circuit of the monostable flip-flop results from the series connection of two reversal steps 90, 91, whereby the output of the second step 91 is coupled back to the input of the first step 90 via a condenser 92. When at a standstill, transistor 93 is conducting and transistor 94 is blocked. A pulse active at input 89 blocks transistor 93 and, as a result, transistor 94 is switched on. The sudden voltage jump at output 72 causes a shift of the feedback condenser 92, due to which transistor 93 remains blocked even after the input pulse has disappeared. Only after condenser 92 has discharged again via a resistance 95 does the step flip back into its rest position. The duration is determined by the product of resistance 95 and condenser 92, so that the duration can be adjusted by selecting a variable resistance 95. The resistances 96 to 98 simply serve as grid potential. The monostable flip-flop can, of course, also be obtained by the combination of a bistable flip-flop with a cutoff trigger. If a position detector, with which it is possible to ascertain the angular position of the windshield wiper, is provided on the windshield wiper or windshield wiper motor, then one can also calculate the time required for the windshield wiper to reach its end position. With these measurements — time and/or angular position — the delay time of the delay circuit 84 can be regulated and adjusted so that the new control pulse for the windshield wiper takes place exactly in the starting position. A special device for detecting the starting position of the windshield wiper is not required in this case.

FIG. 10 shows another circuit in which the time-delay connection is made by a flip-flop 99. If the AND condition is at AND gate 87, then this gate 87 emits a start pulse 89. This start pulse, however, still does not activate the new start of the windshield wiper, but only the setting of flip-flop 99. The output 100 of flip-flop 99 is hereby activated. If the windshield wiper now reaches it end position, which can be detected by the end position detector 101, then an impulse reaches an AND gate 103 via line 102, which now switches through because its AND condition is fulfilled. The signal at its output 72 then energizes motor 70. The end position detector 101 places flip-flop 99 back into its starting position via line 104 with a slight time delay. The second output line 105 of flipflop 99 is not required. The information "wiper at rest" can be picked up directly as potential condition in modern conventional windshield wiper controls. A special device 101 for detecting the end position is, therefore, not required in practice. A control connection of an automatic "zero-back stroke" of the windshield wiper motor has a ground potential when at rest, whereas the wiping movement does not. Windshield wipers are also known in which the automatic zero-return stroke is carried out by a mechanical contact. The information "rest position" can also be obtained hereby.

FIG. 11 shows a circuit with which the principle illustrated in FIG. 8 can be realized. It is understood that other circuits are possible. Similarly, it is possible to carry out the necessary function with help of a suitably programmed microcomputer.

The ends $V_1$, $V_2$ of sensor 3, shown e.g. in FIG. 2, lie at direct-current positive or direct-current negative potential via resistances 30 or 32 respectively. Since the ohmic resistance of sensor 3 is variable, the voltage, which drops between resistances 30 and 32 at sensor 3, also changes. This changing voltage value is monitored by a threshold monitoring device 35 which reads off a reference voltage value at a voltage divider consisting of two resistances 31, 34. Functionally, the threshold monitoring device 35 corresponds to threshold detector 83 of FIG. 8. With help of resistances 31, 34, a resistance threshold can be set at which, when fallen below, a signal appears at the output of the monitoring device 35. This monitoring device 35 can, e.g. be an operational amplifier LM 741 connected as threshold switch. The output signal is then led to a resistance 43, to which a breakdown diode 44 is subsequently added whose anode lies at the emitter of a transistor 45 and whose cathode lies at the said resistance 43. The duty of this breakdown diode 44 is to prevent a premature connecting through of transistors 45, 33, i.e., a connecting through when the output voltage of the monitoring device 35 is too low, for example, when the operational amplifier is operated with only two potentials.

With the help of a further monitoring device 40, which functionally corresponds to the resistance variation detector 85 of FIG. 8 and which is e.g. a differentiating element which is realized by an operational amplifier LF 357, it is determined whether the resistance value of sensor 3 is dropping or increasing. The slope of the drop or increase is determined by feedback resistances 38, 39. The current actual voltage, which is compared with a previous actual voltage, reaches an input of the device 40 via a resistance 36. The previous voltage is, on the other hand, stored in a condenser 41 via resistance 36 and in a condenser 42 via resistances 36, 37.

The AND gate 87, described in connection with FIG. 8, is realized by transistors 33 and 45 in FIG. 11. If the windshield wiper is in its starting postion, then a command signal starts transistor 45 via a resistance 46. Resistance 46 is hereby the terminal of a wiper motor which emits a negative potential when the wiper is at zero. Transistor 45 then transmits the signal coming from device 35 to the base of transistor 33, whereupon this transistor 33 is connected through and gives the signal coming from device 40 to a timing circuit 49, e.g. to a timer NE 555. This timing circuit 49 corresponds to the signal delay 84 of FIG. 8. The length of the pulse of this timing circuit is determined by a resistance 50 and a condenser 51. Resistances 47, 48 and condenser 5 are used for the usual wiring of the timing circuit 49. A switching relay 54 is started for a period of time determined by the timing circuit 49, said switching relay hereupon activating a windshield wiper motor which is not shown. Functionally, this switching relay 54 essentially corresponds to relay 71 in FIG. 7. A short-circuit diode 53, which short-circuits the self-induction of the relay coil, is connected in parallel to switching relay 54. Thus, relay 54 energizes a wiper motor and interrupts e.g. the return circuit. The return circuit in represented in FIG. 7 by relay 76.

By changing the switching time of time circuit 49 with a wiping frequency below a certain value, which is e.g. set during a heavy rain, annoying wiping pauses can be prevented. Annoying wiping pauses are of the kind where the windshield wiper stops for only a relatively short time so that the stop is not "worth it", instead, a continuous wiping would be more welcome. In order to avoid these unpleasant out-times, the switching time of time circuit 49 can be reset each time in that the AND condition is present at AND circuit 87.

To obtain the resistance variation detection, differentiating circuits can be used (see Beuth, Schmusch: Grundschaltungen der Elektronik [Basic Circuits of Electronics], Volume 3, 4th edition, 1981, p. 223, Diagram 712 and p. 288, 291), with which it is possible to detect positive or negative slopes of a curve. To ascertain the degree of variation, a two-step differentiation can be effected. It is, however, also possible to use several threshold switches herefor, each with different threshold values, which will be described in greater detail in connection with FIG. 12.

With a further voltage divider 110, 111, a further threshold switch 112 can be started which starts a timing circuit 113, which activates a relay 114 which introduces a wiping/washing operation. In a wiping/washing operation, water is usually sprayed onto the windshield which is then wiped several times. This type of a wiping/washing mechanism can also be provided for headlights.

As already noted above, device 85 or 40 can be obtained by differentiating elements or by several threshold switches. FIG. 12 shows a circuit with several threshold switches 120 to 131, which each lie at various voltage dividers 132 to 143.

144, 145 designate the two output connections of sensor 3. The direct voltage supply takes place via connections 146, 147, whereby connection 146 can be placed at a motor 149 via a relay contact 148. With threshold switches 120 to 131, it is possible to pick up twelve different thresholds which is necessary in view of the complicated curve slope of FIG. 5.

A condenser 151, to which a voltage stabilizer 150 and two condensers 152, 153 are subsequently added, is connected in parallel to voltage source 146, 147. A diode 270, a resistance 154 and a further diode 155 lie between the output connection 144 and these condensers 152, 153. The voltages in front of and behind diode 155 are read at connections 156, 231.

The circuit according to FIG. 12 contains both the threshold detector and the resistance variation detector. Threshold $R_0$ is, for example, detected by threshold detector 120, whereas the resistance variation is determined with the remaining threshold detector. If threshold switch 120 fails, then the next threshold switch 121 can determine the basic threshold which is now slightly offset vis-à-vis $R_0$.

All the threshold detectors 120 to 130, with the subsequently connected condensers 157 to 167 respectively, only emit a signal if their respective threshold is exceeded in a certain direction. Since each exceeding of a threshold value contains a change of the measured valued and since the threshold switches 120 to 130 only emit a signal when the resistance value drops, an output signal of a threshold switch indicates that the resistance value has decreased, namely, at that point which is being monitored by the respective threshold switch. It becomes possible, with the help of several threshold switches 120 to 130, to pick up the directed voltage variations at several points of a changing resistance curve. If, for example, a wiper blade comes into contact with sensor 3, then this almost represents a short-circuit, so that all threshold switches respond. If the resistance value then increases again because the wiper blade has left the sensor, than only e.g. the twelfth, eleventh, tenth and ninth threshold switches flip back. The remaining threshold switches remain activated due to residual moisture and the like.

In an ideal wiping operation, the resistance value of sensor 3 should be raised from a relatively low resistance value to a very high resistance value after the last wiping operation and if there is no further wetting after that, because an ideal drying of sensor 3 leads to an infinitely high resistance value. The fact that this assumption does not correspond to practice was already explained in greater detail above. To avoid the disadvantages, resulting from these circumstances, resistance variation detector 85 was introduced.

However, this does not eliminate all the disadvantages, conditional on the actual circumstances. If one examines a curve, which corresponds to the curve of FIG. 5, more closely, then one ascertains that it has areas in practice in which the AND condition is fulfilled at gate 87, i.e. the resistance drop and amount below the resistance threshold are only given for a time in which there is no ascending basic tendency, so that it is actually not worthwhile to give a control pulse to the windshield wiper motor. Even with a relatively small variation of the sensor signal, i.e. when the slope of the curve in the area observed is very low, it is undesirable to restart the windshield wiper motor. It would therefore be better to only restart it when the amplitude size of the sensor signal has fallen below a specific threshold value $R_0$, moreover, that there is a resistance variation with falling tendency and, finally, that duration and/or amplitude gradient exceed a certain value. All of these conditions are attained with the circuit in FIG. 12, which has twelve switches at its disposal with which various sensitivities are set. Of course, more or fewer switches can be provided, depending on the accuracy required. Very small variations in the course of the curve in FIG. 5 are equalized by these switches. If the resistance of sensor 3 e.g. continuously decreases, then threshold switches 120 to 131 respond consecutively and emit a pulse. Even the last threshold switch 131 is activated at the lowest resistance value. If the resistance value subsequently increases again, then the threshold switches tilt back by a value which does not correspond to the value at which the respective threshold switch had responded. With increasing resistance, the threshold switches 131 to 120 then tilt back slightly offset. Due to the threshold switches falling back slightly offset, a stabilization of the connecting-through takes place automatically in the switching point of the threshold switch. Otherwise, a resistance value which is in the immediate vicinity of the threshold value would again trigger the threshold switch. Due to the safety clearance which is created by the various switching points, the small fluctuations of the resistance curve around the switching point remain without negative influence. If the last switch 131 is triggered while the resistance value is falling and not reset again, then this means that there is a high degreee of moisture on the windshield which activates the transition to a continuous wiping.

A signal is only given to a signal storage 221 via one of the diodes 179 to 189, a resistance 226 and a final controlled transistor 225 from condensers 157 to 167 lying at each of the outputs of threshold switches 120 to 130 which lie at point 147 at negative potential via one of the resistances 168 to 178 respectively, that is, in form of a pulse. A condenser 161 which is to reduce the voltage fluctuations is situated parallel to the input terminals 146, 147. Signal storage 221, which can be compared with the signal delay 84, is a timer or intermediate storage which always receives a needle pulse because condensers 157 to 167 do not permit continuous signals but only emit a pulse during temporary voltage variations. By avoiding continuous signals, only the respective setting of the threshold switch 120 to 130 is detected. Each of the needle pulses given to the signal storage 221 is a start pulse for the windshield wiper motor. However, this start pulse merely sets and resets the signal storage 221 during the wiping action from the starting position back to the sensor. Since the signal storage 221 has a fixed given storage time, which corresponds to the time which the wiper requires to return from the sensor, i.e. from leaving the sensor, to the starting position, e.g. 500 msec, although the storage time is activated with each pulse, it remains ineffective until the windshield wiper reaches the sensor on the return stroke. Only when the windshield wiper has passed over the sensor on the return stroke, do the pulses appearing during the last windshield wiper movement actually set the signal time, because the pulses still coming do not result in any resetting of the timing circuit. The signal storage 221 is, thus, started by each pulse in such a way that it begins to run. If a new pulse appears, then it starts again from the beginning and begins anew with the running time. Only the pulses which reach it from the end flank or tangent of the sensor ensure that a storage time of e.g. 500 msec is guaranteed in each case. If a pulse, and otherwise no further pulse, now appears directly at the back sensor contact point, then this pulse is sufficient to guarantee the 500 msec because the signal storage is set at this amount. Although each subsequent pulse allows the signal storage 221 to start again from the beinning, this does not matter because the 500 msec are sufficient in every case to effect an AND condition in the end position of the windshield wiper. The start signal is then transmitted in a delayed manner. Thus, it appears only when the following condition is fulfilled: resistance threshold is not attained, directed variation tendency of the resistance value is detected and the amount of the variation corresponds to a preset value.

The circuit resistances 217, 218, 222, 223 and circuit condensers 219, 220, 224 are laid in such a way that this signal is present as an L-signal at a basic resistance 216 of a transistor 215. This L-signal represents a time which is determined by resistance 218 and condenser 219, whereby this is, as already noted, that time which passes from the last contact of the sensor by the wiper until the rest position of the wiper is reached.

Threshold switch 131 has, in contrast to threshold switches 120 to 130, no condenser at the output and starts a set input of the signal storage 221 via a breakdown diode 190, a resistance 191 and a transistor 192. The result of this is that, when this step is reached until it is reset, the output signal of the signal storage 221 is fixed as base current of the transistor 215 and therewith as an AND condition, since continuous wiping should be guaranteed once the last threshold switch 131 is reached and until it is reset, because only after at least one of the threshold switches 120 to 131 has been reset can a new wetting of sensor 3 be evaluated.

The end position detector for the windshield wiper is obtained in FIG. 12 by a resistance 207, a condenser 208, a resistance 209, a resistance 210, a transistor 211, a resistance 212, a resistance 213 and a transistor 214. If there is, therefore, an electric signal at terminals 227, 228, which points to the rest position of the windshield wiper, then this signal is recognized and negative potential is thus given to the emitter of transistor 215 as a further AND condition, i.e. transistor 215 connects through.

Transistor 215 indicates a start signal to a second signal storage or timer 202 when the additional AND condition is present; the wiring of said signal storage or timer consists of a resistance 198, a condenser 200, a condenser 201, a resistance 203, a resistance 204, a resistance 205 and a resistance 206.

This second signal storage 202 sets for a time, which is determined by condenser 200 and resistance 206, a relay 195 which is wired with a condenser 193, a resistance 194, a diode 196 and a diode 197. This wiring serves to securely eliminate interference from the signal storage or timer 202 which could otherwise be quite susceptible to trouble from induced currents of the switching relay. The entire wiring of the signal storage 202 is of secondary importance, since it only serves to start relay 195 in a defined manner which then, in turn, activates the windshield wiper motor.

With the circuit according to FIG. 12, it is thus possible to trigger the windshield wiper in a particularly advantageous manner. If one imagines, for example, the curve of the resistance value as it would extend without the appearance of a new wetting, that is, only due to the residual moisture present and pollution, and if one compares this curves course with the course of a curve produced solely by wetting which, though, cannot be measured as such because it is superimposed on the non-wetting curve, then it becomes apparent that, above a preset amplitude value of the resistance and with an amplitude variation in the given direction, there could be a faulty release if the amount of variation is not introduced as an additional criterion. If, for example, the theoretical non-wetting curve changes only slightly due to some influences, e.g. due to air flow which reduces the residual moisture, or due to additional light soiling, then a tiny droplet of moisture can already trigger the windshield wiper because the only measurable actual resistance course is the one which is also determined by this droplet. Due to the droplet, this resistance course receives a variation tendency in direction of lower resistance values, so that, without an additional sensitivity damper, this droplet could trigger the windshield wiper even though the influence of the droplet on the residual moisture which is present anyway is extremely slight. An unnecessary operation of the windshield wiper can thus be prevented by the possibility of reducing the sensitivity by connecting several threshold value switches.

FIG. 13 shows a circuit which starts the washing process. Unlike the wiping operation which requires that the windshield be wet, the wiping [sic] process requires that the windshield be dirty. With the known controls for windshield wipers, as have been disclosed e.g. in patent application PCT/DE88/00374=WO 89/00119, the windshield wipers are controlled independent of a possible windshield washer system. Windshield washing systems of this type have, in the meantime, often been combined with the windshield wipers in newer vehicles to form a so-called wiping/washing system. The purpose of the wiping/washing system is to clean the windshield, for example, when it has been dirtied by dead insects. To accomplish this, artificial rain is, so to speak, produced by a washing system.

The arrangement described in FIG. 12 can be altered by a slight modification so that it also automatically controls the wiping/washing operation. For this purpose, a device is provided which detects the level of dirt on the windshield and which switches the wiping-/washing system on or off at a given threshold of this level of dirt. This device can be a component of the already described moisture detection circuit, as described in the following. Connection 231 of the circuit of FIG. 13 is, in this case, identical with connection 231 of FIG. 12, while connection 230 is identical with connection 230 of FIG. 12, i.e. the signal is read at the twelfth threshold step. The connection point 235 corresponds to connection point 147 of FIG. 12.

Step twelve or threshold switch 131 respectively in FIG. 12 or even an additional step which is not shown, require a definite amplitude level so that they remain in position. This amplitude level is, however, clearly not attained, at least for a short time after each wiping dry of the sensor, even during extremely heavy rain. If, however, windshield 2 and with it sensor 3 are soiled beyond a degree defined by the threshold of this step, then this step is not set back by the movement of wiper 6 over sensor 3. Due to dirt which dries only slowly and conducts well, this step remains set for a long time which would never be attained with a clean windshield. This is detected by timer 252 in FIG. 13 due to its outer wiring which consists of a transistor 239, a resistance 240, a resistance 251, a condenser 253 and a further condenser 250, and emits, after the time determined by resistance 251 and condenser 256 has elapsed, a pulse from this step, i.e. from input connection 230, to a further timer 260 via a transistor 255. This timer 260 is wired with a resistance 256, a resistance 257, a resistance 258, a condenser 259, a resistance 261, a condenser 262, a condenser 263 and a resistance 264 and sets a relay 268 for a period of time determined by resistance 261 and condenser 262. This relay 268 is actuated by diodes 266, 267 and triggers a wiping/washing system, which is not shown, with its contact 238 which lies between terminals 236, 237 of a direct voltage source. If, due to very heavy soiling, the said step is still not reset after this time has lapsed, then the set pulse for timer 260 is still present as a result of which relay 268 remains excited and the wiping/washing operation continues until the level of dirt has dropped so far that the threshold switch flips back, which can be set by the positive feedback. One of the threshold switches 120 to 131 of FIG. 12 thus forms, in connection with a timing circuit 252, a criterion for determinng whether the windshield is dirty or not. The relatively long time that a threshold step remains fixed is a gauge for the level of dirt. Timer 252 is the more important of the two timers 252, 260 because it determined the setting time, whereas timer 260 only actuates relay 265.

FIG. 14 shows how the invention, that is, in particular, the circuit of FIG. 12, can be used to operate an electric sliding roof, a roof which is raised or the top of a cabriolet.

When the vehicle is in use, the decision should be left to the driver about which position the sliding roof should be in, whereas, when the vehicle has been shut off with an open sliding roof or top, the driver must not "forget" to put the sliding roof into the respectively correct position. If the vehicle has been shut off and the motor turned off, then there is a positive potential via connection 307 at contacts 308 and 315 of a sliding roof to be raised. If contact 308 is closed, then this means that the roof is horizontally open, whereas the closed contact 315 means that the roof is raised and open. As a result of the conditions "motor off" and "contact 308 closed", positive potential reaches the left circuit part with timer 320 and the right circuit part with timer 343. Due to the condition "motor off" and "contact 315 closed", positive potential reaches only the left circuit part. In both cases, however, positive potential is given via a diode 333 to threshold switches 120 to 131, including their input circuit (FIG. 12).

The right circuit part with timer 343 closes and raises the roof when there is a specific degree of wetness on the sensor, e.g. when step eight is reached, since it is undesirable to have a sliding roof horizontally open when there is this amount of rain, whereas a raised opening would still be appropriate. In this case, the top e.g. would be closed in a cabriolet having an electrical sliding roof.

In contrast, the left circuit part closes the roof completely when it is so wet, e.g. at step twelve, that even a raised opening of the roof would no longer be advisable.

It is not illustrated in either case that one could also determine, via a timing circuit each, how long the corresponding moisture condition must be given to trigger the respective function, since short showers, as often occur, are, above all, justifiable for the raised opening.

Due to the relatively high power requirement of roof drives and to conserve the vehicle battery, the roof functions are carried out as single functions without re-opening when the sensor has been dried again by weather conditions, which could however be altered by other roof drives and/or use of solar energy.

Contacts 327 of relay 349 disconnects the function "RAISE ROOF" for that period of time in which the function "close/raise" is being carried out in order to avoid that both functions are simultaneously triggered in the event of very sudden and heavy rain, since the roof drive cannot carry out two functions simultaneously.

Contacts 327 or 360 of relays 349 or 328 respectively take over connecting the positive potential to the left or right lower circuit with timers 320 or 343 for the respective switching times parallel to contacts 308 or 315, since contacts 308 or 315, as the case may, are already in the rest position again, i.e. open, just before the desired switching times have ended. Not all roof drives have a pulse control as yet, with which the complete movement of the roof can be carried out with a pulse given once, rather, it is usual nowadays that the roof only moves as long as the trip switch — or, in this case, the relay contacts — are held in the respective position.

When the rest position is assumed again, that is, if only a raised or completely closed roof is considered, this switches the positive potential at the circuit parts off after the respective relays have dropped, just as with a roof which had not been opened in the first place.

The left lower and the right lower circuit with timers 320 or 343, respectively, are identical except for the size of the individual components. If a potential variation comes out of each of the connected threshold switches at the right or left circuit, then a needle pulse is given to the respective timer.

The left circuit lies, for example, with its connection 302 at point 230 of the twelfth threshold switch according to FIG. 12, in contrast to which the right circuit lies with its connection 334 e.g. at the output of threshold switch 107. A potential variation of either connection 302 or 334 and the subsequently added condensers 361 and 335 results in a needle pulse being given to timer 320 or 343 via a resistance 305 or 336 and a transistor 332 or 338 respectively. As a result of the wiring of timer 320 with resistances 313, 314, 319, 321, 325 and condensers 321, 322, 326 and due to the wiring of timer 343 with resistances 339, 340, 341, 346 and condensers 342, 344, 345, there is a positive potential at the respective timer output which sets relay 328 or 349. These relays 328 or 349 switch, with their contacts 323 or 327, the already described function as well as, with switches 323 or 360, a positive potential for the roof drive functions "close/raise" or "closed" to connections 300 or 301, respectively. The switching time of timers 320, 343 is fixed by resistance 325 and condenser 326 or by resistance 346 and condenser 345. Timers 320, 343 simply have the function to start relays 328, 349 in a defined manner. Wiring diodes 329, 351 or 350, 348 also serve the same purpose.

As can be seen in the above description of the embodiment, the invention is versatile in its application. Due to the possibility of also detecting the degree of moisture and soiling variation quantitatively, a windshield wiper can be operated not only when it is actually required but a wiping/washing mechanism can also be turned on when the windshield is sufficiently dirty. It is even possible to have a special control for a sliding roof, a roof which is raised, a sliding roof which is raised or a cabriolet top. Additionally, splashes on the sensor also trigger the windshield wipers when the wiper has passed over the sensor on its return to the end position.

If there is a drive motor which is speed controllable, the invention can also be used for a control which is dependent on how wet or dirty the windshield is. As a result, a continuous adjustment e.g. of the wiper speed to the respective wetness is possible.

I claim:

1. Device for controlling a drive mechanism (70) for an automotive accessory, having
   a sensor (3) reacting to wetness on the outside of a vehicle, said sensor producing a signal with a parameter dependent on a degree of wetness on the outside of the vehicle, and
   a device (83) for actuating the drive mechanism (70) dependent on the size of the parameter of the signal coming from the sensor (3),
   characterized by a device (120 to 131, 132 to 143) for detecting the amount of variation of the parameter with time and an additional device (225,221; 252,260; 320,343) for actuating the drive mechanism (70) when there is a preset amount of variation of the parameter with time.

2. Device for controlling a drive mechanism according to claim 1, further characterized by a device (157–167) for detecting the positive or negative direction of the variation of the parameter.

3. Device for controlling a drive mechanism according to claim 2, characterized in that the direction of the variation of the parameter is obtained by differentiating once.

4. Device for controlling a drive mechanism according to claim 1, characterized in that the drive mechanism is a windshield wiper motor.

5. Device for controlling a drive mechanism according to claim 1, characterized in that the drive mechanism is a motor for a wiping/washing system.

6. Device for controlling a drive mechanism according to claim 1, characterized in that the drive mechanism is a device for moving at least a part of a roof of a motor vehicle.

7. Device for controlling a drive mechanism according to claim 1, characterized in that the amount of variation of the parameter is obtained by twice differentiating the output signal of the sensor (3).

8. Device for controlling a drive mechanism according to claim 1, characterized in that the amount of the variation of the parameter is obtained by means of several threshold switches (120 to 131).

9. Device for controlling a drive mechanism according to claim 8, characterized in that the direction of the variation of the parameter is ascertained by means of condensers (157 to 167) which are subsequently added to threshold switches (120 to 130).

10. Device for controlling a drive mechanism according to claim 9, characterized in that needle pulses are given to a signal storage device (221) by the condensers (157 to 167) and start a signal delay time.

11. Device for controlling a drive mechanism according to claim 1, characterized in that the additional device (225, 221; 252,260;320,343) for actuating the drive mechanism (70) has several taps (230,231) at which signals are selectively picked up and which indicate, individually or in combination with one another, in various degrees of dirt or wetness, respectively, of a windshield and which each are connected with various drive mechanisms.

12. A device for controlling a drive mechanism according to claim 1 wherein said drive mechanism comprises a windshield wiper motor (70) and said device for actuating said drive mechanism (83, 35, 120) emits a signal for the wiper motor (70) dependent on a size of the parameter of the signal coming from the sensor (3), and further characterized in that a signal storing device (84, 49, 221) is provided which stores the signal coming from the device (83, 35, 120) for actuating the wiper motor (70) for a preset period of time and only triggers the windshield wiper motor (70) when the windshield wiper (5, 6) has assumed its end and starting position.

13. Device for controlling a drive mechanism according to claim 12, characterized in that the storage time of the signal storing device (84, 49, 221) corresponds to that time which the windshield wiper (5, 6) requires to reach its starting position after leaving the sensor (3), whereby the windshield wiper turns in direction of the starting position.

14. Device for controlling a drive mechanism according to claim 12, characterized in that a monostable flip-flop (91,93) is provided as signal storage device, a storage time of said flipflop is adjustable dependent on the position of the windshield wiper (5,6).

15. Device for controlling a drive mechanism according to claim 12, characterized in that a flip-flop (99) is provided as signal storage device which is set when a start pulse for the wiper motor (70) appears and released again when the windshield wiper (5, 6) reaches the starting position.

16. Device for controlling a drive mechanism according to claim 1, characterized in that a control signal for the drive mechanism is only given when three conditions are simultaneously fulfilled:
   a) the parameter of the signal coming from the sensor (3) passes through a preset threshold ($R_0$),
   b) the parameter varies in the preset direction, and
   c) the amount of the variation attains a preset value.

17. Device for controlling a drive mechanism according to claim 1, characterized in that the parameter is the signal amplitude which corresponds to the ohmic resistance of the sensor (3).

18. Device for controlling a drive mechanism according to claim 1, characterized in that the sensor (3) consists of two conduction path arrangements (7, 8) which do not come in contact and which have conductor stays (9, 10, 11; 12, 13, 14) engaging in a cam-like manner.

19. Device for controlling a drive mechanism according to claim 1, characterized in that the sensor (3) has three conduction path arrangements (7, 8, 16) which do not come in contact.

20. Device for controlling a drive mechanism according to claim 1, characterized in that the sensor (3) is embedded in the windshield (2) of a motor vehicle (1) in such a way that it conduction path arrangements (7, 8) align exactly with the outer surface of the windshield (2).

21. Device for controlling a drive mechanism according to claim 1, characterized in that the sensor (3) has conduction paths (7, 8) which take in a surface of seven to eighty $cm^2$.

22. Device for controlling a drive mechanism according to claim 1, characterized in that the sensor (3) is provided in the upper third of a windshield (2).

23. Device for controlling a device mechanism according to claim 22, characterized in that the sensor (3) is provided on the windshield (2) in such a way that it is blocked from the driver's and co-driver's view by a rearview mirror (4).

24. A device for controlling a drive mechanism according to claim 22, characterized in that the sensor (3) is provided on the windshield (2) in such a way that it is blocked from the driver's view by a rear view mirror (4).

25. A device for controlling a drive mechanism according to claim 22, characterized in that the sensor (3) is provided on the windshield (2) in such a way that it is blocked from the co-driver's view by a rear view mirror (4).

26. Device for controlling a drive mechanism according to claim 1, characterized in that the drive mechanism (70) is speed-regulated and is controlled dependent on how wet or dirty the windshield is.

* * * * *

UNITED STATES PATENT AND TRADEMARK OFFICE
CERTIFICATE OF CORRECTION

PATENT NO. : 5,306,992
DATED : April 26, 1994
INVENTOR(S) : Bernhard Droge

It is certified that error appears in the above-identified patent and that said Letters Patent is hereby corrected as shown below:

On the title page:

Item [73] Assignee: Change "Etablissement Voralp, to
--Etablissement VORALP, Schaan, Liechtenstein--

Signed and Sealed this

Thirty-first Day of January, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,306,992
DATED : April 26, 1994
INVENTOR(S) : Bernhard Droge

It is certified that error appears in the above-indentified patent and that said Letters Patent is hereby corrected as shown below:

Item [73] Assignee: Change "Etablissement Voralp, Liechtenstein, Fed. Rep. of Germany", to --Etablissement VORALP, Schaan, Liechtenstein--

Signed and Sealed this

Eleventh Day of April, 1995

Attest:

BRUCE LEHMAN

Attesting Officer        Commissioner of Patents and Trademarks